United States Patent [19]

Golding et al.

[11] Patent Number: 4,916,020

[45] Date of Patent: Apr. 10, 1990

[54] REACTIVE BONDING METHOD

[75] Inventors: Wanda W. Golding, Angleton; Bobby R. Ezzell, Lake Jackson, both of Tex.

[73] Assignee: The Dow Chemical Company, Midland, Mich.

[21] Appl. No.: 160,796

[22] Filed: Feb. 26, 1988

[51] Int. Cl.$^4$ .................. B32B 15/08; B32B 27/06
[52] U.S. Cl. ............................ 428/421; 428/422; 428/423.1; 428/426; 428/463
[58] Field of Search ............ 428/220, 319.7, 422, 428/420, 421, 426, 423.1, 463; 524/795; 526/243; 521/27, 38; 417/568

[56] References Cited

U.S. PATENT DOCUMENTS

| | | | |
|---|---|---|---|
| 3,257,266 | 6/1966 | Sapper | 428/421 |
| 3,282,875 | 11/1966 | Connolly | 524/795 |
| 3,692,569 | 9/1972 | Grot | 428/319.7 |
| 3,784,399 | 1/1974 | Grot | 417/568 |
| 3,946,136 | 3/1976 | Fitz et al. | 428/422 |
| 4,085,071 | 4/1978 | Resnick et al. | 428/220 |
| 4,329,435 | 5/1982 | Kimoto et al. | 521/38 |
| 4,330,654 | 5/1982 | Ezzell et al. | 526/243 |
| 4,358,545 | 11/1982 | Ezzell et al. | 521/27 |
| 4,595,632 | 6/1986 | Mayham et al. | 428/421 X |
| 4,715,919 | 12/1987 | Fakirov et al. | 428/420 X |

OTHER PUBLICATIONS

Designation: D 1781—76, Standard Method for Climbing Drum Peel Test for Adhesives, pp. 125-130, reapproved 1981.

Designation: D 1002—72, Standard Test Method for Strength Profiles of Adhesives in Shear by Tension Loading (Metal—to—Metal), pp. 59-63, reapproved 1983.

Polymer Interface and Adhesion, Souheng Wu, Marcell Dekker, Inc., New York, 1982, pp. 280, 283, 298-299, 304, 322-323.

Primary Examiner—Thomas J. Herbert

[57] ABSTRACT

A composite comprising a functional fluoropolymer having pendant groups which terminate with a second reacting group and a first substrate having a first reacting groups, wherein at least a portion of the first reacting groups and at least a portion of the second reacting groups have reacted with each other to form covalent or ionic bonds.

22 Claims, 1 Drawing Sheet

REACTIVE BONDING METHOD

BACKGROUND OF THE INVENTION

Fluoropolymers are well known for their ability to withstand strenuous environments, because they are substantially completely nonreactive with most chemical reagents including most acids, bases, oxidizing agents, and reducing agents. For this reason, fluoropolymers, particularly fluoropolymers such as polytetrafluoroethylene and copolymers of tetrafluoroethylene and hexafluoropropylene or perfluoroalkyl vinyl ethers, are used extensively in applications requiring chemical inertness. Besides inertness, fluoropolymers are well known for their heat stability, with maximum service temperatures as high as 500° F. (260° C.).

Despite the many desirable properties of fluoropolymers, they have certain disadvantages. They are expensive and, in certain cases, have deficiencies as structural plastics. For these and other reasons, it is desirable to have technology to efficiently coat substrates with fluoropolymers so that the positive features of the fluoropolymers and the substrates can be used while minimizing their inherent disadvantages. However, untreated fluoropolymers cannot be efficiently and effectively bonded to other materials using conventional adhesives. Sometimes fluoropolymers can be applied and hot melted to other materials, but the coated material must be able to withstand the heat necessary to melt or soften the fluoropolymer. Furthermore, fluoropolymers applied as hot melts often fail upon temperature cycling and separate from the substrate as a result of differences in thermal expansion coefficients between the fluoropolymer and the substrate on which it is coated. Fabrication of fluoropolymer-coated large objects or thick fluoropolymer coatings on substrates presents additional difficulties because large objects are difficult to heat evenly across their entire mass and because some layers of fluoropolymer degrade under the heat used for applying additional coatings. Historically, several approaches have been used to bond fluoropolymers to substrates. These methods include sodium etching, plasma treatments, photochemical treatments, and mechanical abrasion. Such methods are discussed in *Polymer Interface and Adhesion,* by Souheng Wu, Marcel Dekker, Inc., N.Y., 1982, pages 280, 283, 298–299, 304, 322–323. A need exists for a simpler, more efficient method to bond fluoropolymers to other materials. The present invention provides such a method.

BRIEF DESCRIPTION OF THE INVENTION

The invention is a method for reactive bonding a functional fluoropolymer to a first substrate comprising:

(a) contacting a first substrate having a first reacting group with a functional fluoropolymer having pendant groups which terminate with a second reacting group;

(b) reacting the first reacting group with the second reacting group to bond the functional fluoropolymer to the first substrate.

The invention also includes a composite comprising:
a functional fluoropolymer having pendant groups which terminate with a second reacting group and
a first substrate having a first reacting groups, wherein at least a portion of the first reacting groups and at least a portion of the second reacting groups have reacted with each other to form covalent or ionic bonds.

DETAILED DESCRIPTION OF THE INVENTION

The present invention uses the functional feature of the class of fluoropolymers 100 to achieve adhesion using a reactive bonding technique. The functional groups of the fluoropolymers form either ionic or covalent bonds to substrates to achieve what is herein called reactive bonding.

Figure 1:
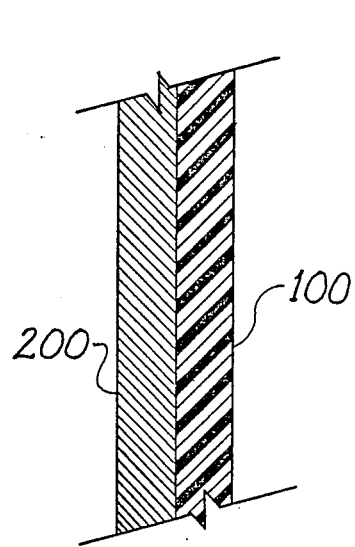
FIG. 1 shows functional fluoropolymer 100 bonded to a substrate 200.

The reactive bonding techniques of the present invention can be used, for example, to bond a functional fluoropolymer 100 to a first substrate 200, as shown in FIG. 1. In this embodiment, the functional fluoropolymer 100 can act as a coating on the first substrate. Reactive bonding occurs between the functional fluoropolymer 100 and the first substrate 200. This embodiment can be used to provide a functional fluoropolymer coating on a substrate. The so-coated first substrate can provide the properties such as inertness of the functional fluoropolymers while having the structural integrity of the first substrate.

Figure 2:
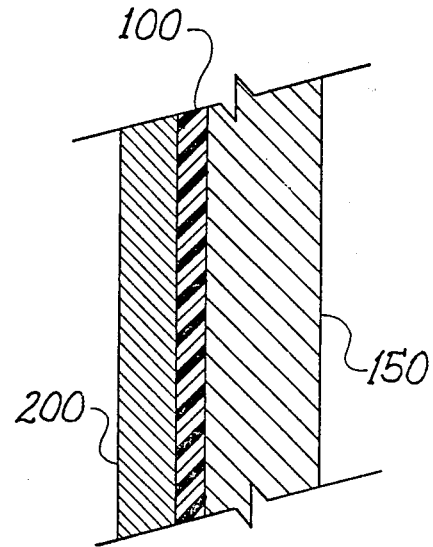
FIG. 2 shows functional fluoropolymer 100 bonded to first body 150 and bonded to first substrate 200.

Alternatively, the functional fluoropolymer 100 can be used to bond a first body 150 to a first substrate 200, as shown in FIG. 2. In this manner, functional fluoropolymer 100 acts, in effect, as an adhesive to bond first body 150 to first substrate 200. This embodiment can be used, for example, to bond a nonfunctional, melt-formable fluoropolymer such as PFA Teflon ™ or FEP Teflon ™ (first body 150) to a first substrate 200. Teflon ™ is a trademark of E. I. du Pont de Nemours Company. The reactive bonding occurs between the functional fluoropolymer 100 and the first substrate 200, while the functional fluoropolymer 100 is attached to the first body by conventional techniques, such as melt bonding. Reactive bonding between the fluoropolymer and the first body is not possible because the first body does not have reactive sites. This embodiment can be used, for example, to bond Teflon ™ (first body) to an epoxy resin (first substrate).

Figure 3:
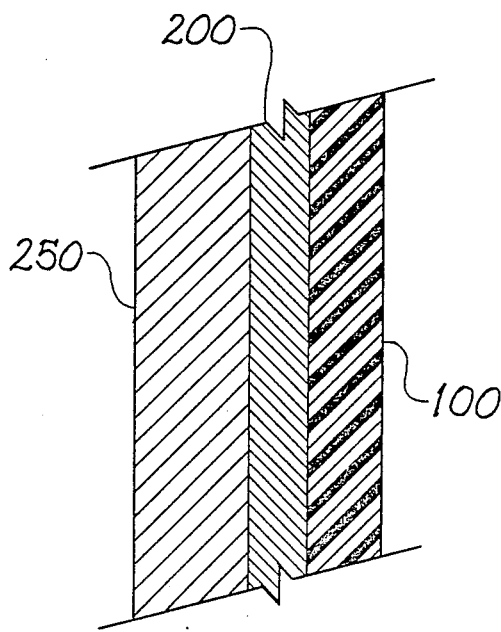
FIG. 3 shows functional fluoropolymer 100 bonded to first substrate 200, which is bonded to second substrate 250.

Optionally, the reactive bonding techniques of the present invention can be used to bond functional fluoropolymer 100 to a first substrate 200, which is, in turn, bonded to a second substrate 250, as shown in FIG. 3. This embodiment can be used, for example, to form a functional fluoropolymer 100 coating on a second substrate 250. The first substrate 200 acts as an adhesive to bond the functional fluoropolymer 100 to the second substrate 250. This embodiment can be used, for example, to form a fluoropolymer coating on a second substrate such as steel using an epoxy resin as the first substrate. The reactive bonding occurs between the functional fluoropolymer 100 and the first substrate 200. The first substrate 200 can be bonded to the second substrate 250 using reactive bonding or conventional techniques, such as melt bonding.

Figure 4:
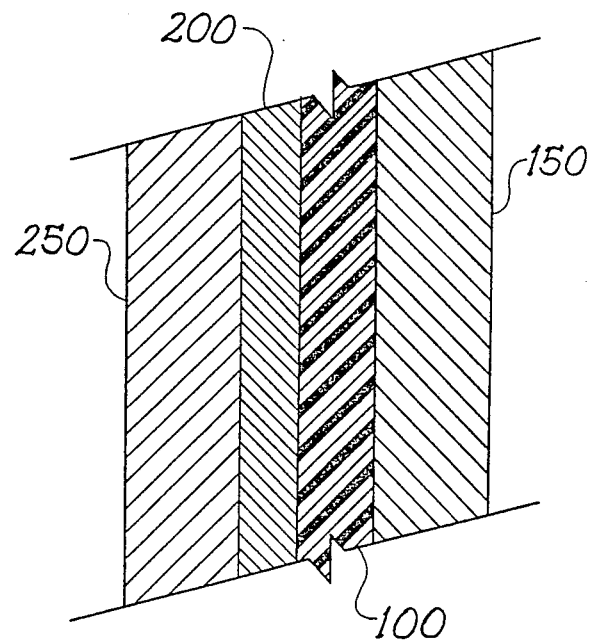
FIG. 4 shows functional fluoropolymer 100 bonded to first body 150 and bonded to first substrate 200, which is bonded to second substrate 250.

Optionally, as shown in FIG. 4, the reactive bonding techniques of the present invention can be used by bonding functional fluoropolymer 100 to first substrate 200 using reactive bonding methods, while the functional fluoropolymer 100 is also attached to first body 150 and the first substrate 200 is attached to second substrate 250. This embodiment can be used, in effect, to attach a first body 150 to a second substrate 250 using the functional fluoropolymer 100 and first substrate 200. For example, a nonfunctional melt formable material such as FEP Teflon ™ or PFA Teflon ™ can be the first body 150. It can be attached to functional fluoropolymer 100 through, for example, melt bonding. Steel, for example, can be used as the second substrate 250. The steel can have, for example, an epoxy resin coating (first substrate 200). The epoxy resin (first substrate 200) can be reactive bonded to the functional fluoropolymer 100, thus bonding the Teflon ™ (first body 150) to the steel (second substrate 250), through the fluoropolymer-epoxy resin bond.

Fluoropolymer 100

Functional fluoropolymer 100 having pendant acid groups or groups easily convertible to acid groups are well known in the art. These fluoropolymers have been primarily developed for use as ion exchange membranes in chlor-alkali cells, although other applications, such as acid catalysts, are known. The fluoropolymers developed most extensively have sulfonic or carboxylic acid functional groups, although other groups such as the acids of phosphorus have been disclosed in the art.

The present invention discloses new and useful methods for reactive bonding functional fluoropolymers 100 to other materials and for using functional fluoropolymers 100 as an adhesive for bonding a plurality of substrates together. The method makes use of a variety of functional fluoropolymers 100 including those disclosed in U.S. Pat. Nos.: 3,282,875; 4,329,435; 4,330,654 and 4,358,545. These functional fluoropolymers have the following general structure:

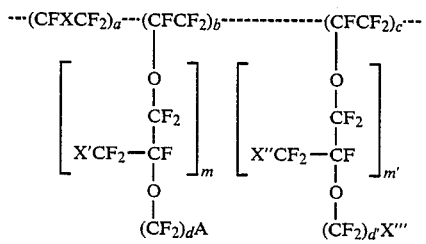

where:
a and b are independently an integer greater than zero;
c is zero or an integer greater than zero;
X, X', X" and X''' are independently halogen, —CF$_3$ or a fluorinated alkyl having from 2 to 10 carbon atoms;
m and m' are independently an integer from zero to four;
d and d' are independently an integer from one to six;
A is an acid or an acid derivative such as a sulfonic acid group, a carboxylic acid group, a derivative of a sulfonic acid group or a derivative of a carboxylic acid group.

The most commonly available polymers have c as zero, m and m' as 1, X as F, X', X", and X''' independently as F or Cl, and A as a sulfonic or a carboxylic acid group, or a sulfonic or carboxylic acid derivative.

The critical feature of functional fluoropolymers 100 is that they have a pendant functional reactive site defined by "A". It is intended to be understood that functional fluoropolymers meeting this criteria, but not within the constraints of the structures defined above, would perform suitably in the method of the present invention and are included in the scope of this invention.

The functional fluoropolymers 100 defined above are useful for reactive bonding to other materials by attachment through group "A". Reactive bonding can occur through the formation of covalent or ionic bonds. However, covalent bonds are generally more permanent than ionic bonds.

For use in the present invention, it is sometimes advantageous to first synthesize the functional fluoropolymers as acid derivatives, rather than as acid groups, because, as acid derivatives, they may be thermally processed, i.e., heat will soften the fluoropolymers so that they may be easily coated onto other materials. Later, they may be converted to their acid or acid salt forms. Using thermoplastic functional fluoropolymers, functional fluoropolymers may be easily made into films or other shapes using conventional thermoplastic-forming equipment. Thus, sulfonic functional fluoropolymers are desirably made in the sulfonyl fluoride, —SO$_2$F, form and carboxylic functional fluoropolymers are desirably made in the ester form, —CO$_2$R. These are their thermoplastic forms. They may be easily converted to acid salts by hydrolysis with aqueous base, such as the hydroxides of sodium or potassium. Such conversion techniques are well known in the art.

It is also well known in the art to convert sulfonyl fluoride functional fluoropolymers to sulfonamide functional fluoropolymers by reaction with ammonia or amines (U.S. Pat. Nos. 3,784,399 and 4,085,071). This is helpful in certain bonding procedures where the fluoropolymer is to be bonded to a material that readily reacts with amines.

The equivalent weight of the functional fluoropolymer 100 can vary greatly and still be useful in the present invention. "Equivalent weight" (EW) is the amount of fluoropolymer in the acid form required to neutralize one equivalent of base. Typically fluoropolymers 100 have equivalent weights between about 500 and 2000. In general these EW's correspond to useful ranges for fluoropolymers when they are to be used as ion exchange membranes in chlor-alkali cells. However, these same EW ranges would not necessarily apply to the applications of the present invention and a much wider range of EW's can be used. On a cost consideration, it is desirable to use as high an EW fluoropolymer as practical, because the functional monomers used in making fluoropolymers 100 are considerably more costly than nonfunctional comonomers (the monomers with which the functional fluoropolymers are polymerized) such as tetrafluoroethylene. Besides cost, the higher equivalent weight fluoropolymers 100 are more similar in character to typical fluoroplastics such as polytetrafluoroethylene. In certain embodiments, this matching of chemical and physical characteristics can have its advantages. For example, the embodiment illustrated in FIG. 2 and the embodiment illustrated in FIG. 4 have the functional fluoropolymer 100 attached to a nonfunctional fluoropolymer 150. If the functional fluoropolymer 100 is chemically and physically similar to the nonfunctional fluoropolymer 150, attachment is easier. On the other hand, higher EW means fewer sites available for chemical reactive bonding. Often chemical bonding density is not critical, but lower EW greatly increases the probability that sufficient reactive bonding will occur. Thus, equivalent weight is a variable that may be tailored to achieve maximum performance in each embodiment. Equivalent weights from about 300 to 100,000 or higher are useful in the present invention. Preferably, EW's from 500 to 10,000 are used to prepare functional fluoropolymers 100. More preferably, the EW is between about 600 and about 3000.

First Body 150

The first body 150 is a melt formable, nonfunctional fluoropolymer. Such fluoropolymers include FEP Teflon ™ and PFA Teflon ™. These polymers are particularly suitable because of their melt-flow properties and are widely used in industry for that reason.

First Substrate 200

The first substrate contains the first reacting group and can include such things as epoxy resins, functional hydrocarbon polymers, urethanes, or the like. The first substrate can be a body which is to be at least partially coated with functional fluoropolymer 100, or it can be in the form of particles, which are blended with and form reactive bonds with the functional fluoropolymer 100.

Second Substrate 250

The second substrate is a nonfunctional material such as metals, ceramics, glass, and plastics.

Fluoropolymer blending with a Second Substrate in particle form

The fluoropolymer 100 can be in the form of particles. It is well known that, in general, fluoropolymers are not compatible with many other materials. Thus, well dispersed mixtures of fluoropolymers and most hydrocarbon polymers are difficult to achieve and retain. Such mixtures may be desirable, however, to impart desirable features from the fluoropolymer. These features can be improved dielectric, lubricity, fire retardance or other properties known for fluoropolymers. Thus, as an example, a finely particulated fluoropolymer having sulfonyl fluoride, sulfonic acid, carboxylic ester or acid functionality can be intimately blended with a standard epoxy formulation (as a second substrate) containing epoxide and a hardening agent to form, upon curing, a stable and chemically bounded fluoropolymer/epoxy resin dispersion. This same reactive bonding technique is equally useful for forming dispersions of fluoropolymers in urethanes or any other polymer capable of forming chemical bonds with the fluoropolymer.

A particularly advantageous technique for accomplishing the type reactive chemical bonding described above is to derivatize the functional fluoropolymer 100 before mixing it with the first substrate material. In this way it is possible to avoid unwanted by-products in the final mixture. The preferred means to obtain a fluoropolymer/epoxy blend is to first react the functional fluoropolymer 100 with a polyfunctional amine hardener, thus forming functional fluoropolymer 100 having pendant, free, amine groups attached to the functional fluoropolymer through the sulfonamide linkage. Blending the functional fluoropolymer 100 thus formed with an epoxy resin results in chemical reactive bonding without the attendant formation of hydrogen fluoride. The functional fluoropolymer/amine reaction product is neutralized and purified before being reacted in the final mixture. This same procedure can be used for esters of carboxylic acids or other acid functional fluoropolymers. Polyurethane, urea, or amide polymer systems will also work using the same techniques as described for epoxy resins above. The critical factor in these techniques is the fact that the functional fluoropolymer 100 as is, or in a derivatized state, is reactive with the other polymeric material or with an ingredient in the other polymeric material.

DERIVATIZING THE FLUOROPOLYMER

A variety of reactants can be used to derivatize the functional fluoropolymers 100 for use in the present invention. The reagent used to derivatize the functional fluoropolymers 100 must have a site capable of reacting with the functional fluoropolymer 100 and must have sites capable of reacting with the first substrate 200 or with an adhesive present on the surface of the first substrate 200. It is possible, and sometimes desirable, to use a derivatizing reagent that is multifunctional. One type of group can react with the fluoropolymer and another type of group can react with the first substrate. Exemplary of this technique is the reaction of amino alcohols such as monoethanol amine with the sulfonyl fluoride functional fluoropolymer. Alcohols are known to work well with many adhesives and undergo many chemical reactions useful for reactive bonding in the present invention. Examples of reagents useful for derivatizing the functional fluoropolymer include: polyamines such as diethylenetriamine, triethylenetetramine, tetraethylenepentamine, and highers; diamines such as ethylenediamine, diaminopropanes, hexanediamine, aminated polyglycols, diaminocyclohexane, diaminodiphenyl sulfone, piperazine; and aminoalcohols such as mono- or diethanolamine and aminoethylethanolamine. The basic criterion is when only one amine group is present that it not be tertiary when the functional group of the fluoropolymer is in the form of an acid halide such as sulfonyl fluoride or ester such as the methyl ester of carboxylic functional fluoropolymers. When the functional fluoropolymers 100 are in the acid form, any amine including tertiary amines are suitable since salt formation can occur.

Uses

A utility of the present invention of particular value is the use of functional fluoropolymers 100 for coating other materials, as shown in FIGS. 1 and 3. A particularly useful variation is the functional fluoropolymer serving primarily as a transition or glue layer between a nonfunctional fluoropolymer and another polymeric material reactive with the functional fluoropolymer, as shown in FIGS. 2 and 4.

The use of the functional fluoropolymer 100 as a transition or glue layer between a nonfunctional fluoropolymer (first body 150) and another polymeric material (first substrate 200) can be readily accomplished when the functional fluoropolymer 100 is physically compatible with the nonfunctional fluoropolymer (first body 150). Exemplary of this is melt forming a fluorosulfonyl functional fluoropolymer 100 onto one surface of a copolymer of tetrafluoroethylene and hexafluoropropylene (FEP Teflon ™). This can be accomplished by hot pressing, coextrusion, or casting from solution or suspension followed by hot pressing. The resulting composite (functional fluoropolymer/first body) can then be used, functional side first, to coat other reactive substrates (first substrate 200), as shown in FIG. 2 and FIG. 4. As an example, the composite structures described above, preferentially after reaction with a polyfunctional derivatizing agent such as a polyamine, can be laminated onto a fiber reinforced epoxy structural component (second substrate 250) using epoxy adhesive (first substrate 200) between the functional fluoropolymer 100 and the second substrate 250, as shown in FIG. 4. In fact, the fluoropolymer/first body composite can be laminated onto any second substrate 250 using any first substrate 200 that is reactive with the functional fluoropolymer 100 and a useful adhesive for the second substrate 250. The result is a functional fluoropolymer 100 coating, with all the attendant benefits of the fluoropolymer, on another material (second substrate 250) that can be both cheaper and structurally superior to the functional fluoropolymer itself. Optionally, the functional fluoropolymer 100 can be bonded directly to the second substrate 250 using the first substrate 200 and serve as the fluoropolymer surface as well, as shown FIGS. 1 and 3. It is not necessary that the second substrate be another polymeric material. With proper choice of adhesive (first substrate 200), the second substrate 250 can be metal or even ceramic. One example would be reactive bonding the functional fluoropolymer/first body composite described above having pendant amine functionality to steel (second substrate 250) using ethylene-acrylic acid adhesive as the first substrate 200. Here reactive bonding would be ionic through the formation of amine-carboxylate salts.

A variant of the above composite is nonfunctional fluoropolymer fibers (first body) coated with functional fluoropolymers 100. These fibers may be coextruded with the functional fluoropolymer 100 on the outside of nonfunctional fluoropolymer fibers. The method of coating is not critical. It can be accomplished from solutions or suspensions or by melt coating of the functional fluoropolymer 100 onto the nonfunctional fibers (first body 150). The latter technique is particularly useful when the nonfunctional fibers (first body) is polytetrafluoroethylene (PTFE). Here, coextrusion is difficult or impossible, and thus coating is by far the method of choice. Because the melting point of PTFE is so high, it is convenient to encapsulate by extrusion melt coating PTFE fibers much like coatings are placed on wire. Here, the PTFE fiber is passed through a wire coating die in the place of metallic wire and coated with a functional fluoropolymer.

Fibers of the type described above are useful for a variety of applications, but particularly where fluoropolymer fibers are desirable for reinforcement. The thus-coated fibers may be used as loose fill or woven or knitted to form fabrics or scrims. In whatever form, the coated fibers are useful as a means of achieving adhesion or bonding between the fibers and the material to be reinforced. In the case where the fibers re woven, it is advantageous to melt the fibers together at the points of fiber crossover by taking advantage of the functional fluoropolymer while still in the thermoplastic form. This is particularly true when the nonfunctional fiber is PTFE and a loose weave or scrim is the desired article. Without doing so, results in a structurally inferior product. Besides reinforcement where the above coated fibers are chemically bonded to the substrate, a special case is the fibers or woven structures being used to reinforce membranes made from the same functional fluoropolymers. In this special case, the fibers are not chemically reactive with the substrate, but are totally compatible and thus easily melted together such that, in essence, the membrane encapsulates the fibers.

EXAMPLE 1

This example shows that a functional fluoropolymer 100, surface derivatized to the amide form, bonds to an epoxy resin (first substrate 200) which is, in turn, bonded to a stainless steel metal strip (second substrate 250). This example illustrates the embodiment of FIG. 3.

Three derivatives of a 20 mil (0.51 millimeter) thick film of 1040 EW sulfonyl fluoride functional fluoropolymer 100 are treated with a derivatizing agent to convert the pendant sulfonyl fluoride groups to a sulfonamide derivative. Care is always taken to minimize moisture absorption by the derivatizing agent. Moisture absorption may be minimized by using a vessel which seals tightly or, alternatively a dry nitrogen purge may be used during the derivatization. The first derivative is prepared by treating the functional fluoropolymer 100 with triethylenetetramine for about 15 hours at about 25° C. The second derivative is prepared by treatment with 4,9-dioxa-1,12-dodecanediamine for about 15 hours at about 25° C. The third derivative is prepared by treatment with n-butyl amine for about two hours at about 25° C.

Amide formation in the three derivatives is confirmed by surface analysis of all three samples using a Nicolet 60SX Fourier Transform Infrared Analyzer with an attenuated total reflectance attachment. A decrease in the intensity of the $-SO_2$ antisymmetric stretching band at 1467 cm$^{-1}$ for the $-SO_2F$ functionality is observed, along with the formation of a new band at about 1375 cm$^{-1}$ corresponding to amide $SO_2$ antisymmetric stretching.

A second sample is prepared by taking an 8000 EW sulfonyl fluoride functional fluoropolymer 100 having a thickness of approximately 13 mil (0.33 millimeter) and derivatizing it in triethylenetetramine for about fifteen hours at about 25° C.

The adhesion of these samples to epoxy resin (first substrate) is made and tested using a modified ASTM Standard Number D 1002-72 (Reapproved 1983) "Strength Properties of Adhesives in Shear By Tension Loading (Metal-to-Metal)" lap shear test according to the following procedure. The modification to the ASTM standard consists of placing the fluoropolymer film 100 in the 12.7 millimeter overlap region and applying an epoxy resin adhesive (first substrate) to both sides of the fluoropolymer film 100, otherwise the ASTM standard was followed according to its instructions. Prepared metal strips of 304 stainless steel (serving as a second substrate) are positioned as described in the ASTM test procedure.

The metal strips measure about 4 inches (10.2 centimeters) by about 1 inch (2.54 centimeters) by about 0.0625 inches (1.6 millimeters) and are prepared by the following procedure. First, the metallic strips (second substrate) are degreased for about thirty minutes in an ultrasonic bath containing Chlorothene TM solvent. Chlorothene TM is a trademark of The Dow Chemical Company. The metal strips (second substrate) are then rinsed with water and placed in a approximately 4 weight percent aqueous solution of sodium hypophosphite for about thirty minutes. They are then rinsed with water and air dried.

The following epoxy resin formulation is used as the first substrate:

D. E. R. ™ 331 epoxy resin (a trademark of The Dow Chemical Company, Midland Mich.);

$CaCO_3$ filler added at about 30 parts $CaCO_3$, per hundred parts resin by weight; and Versamid 140 ™ polyamide, as an amine hardener, (a trademark of Henkel Corporation, Minneapolis, Minn.) at about 47 parts Versamid 140 ™ polyamide per hundred parts resin by weight.

Spacer wires with a thickness of about 3 mils (0.076 millimeters) are used to maintain the thickness of the prepared sample.

Samples are cured at room temperature for about two days, with a postcure at about 100° C. for about one hour. Pressure is applied to the 12.7 millimeter overlap region during cure and postcure through the use of ACCO medium binder clips. After postcure, any excess epoxy resin (first substrate) that extends out from the 12.7 millimeter overlap region is removed by filing with a Dremmel tool. An Instron analytical instrument, with a 20,000 pound load cell adjustable from 500 to 20,000 pounds full scale, is used to test the strength of the bond. The crosshead speed is about 0.05 inches per minute.

See the table following Comparative Example 1 for values obtained.

COMPARATIVE EXAMPLE 1

This example shows FEP Teflon bonded to stainless steel strips using the same epoxy formulation and the same procedures discussed in Example 1. This bonding does not involve reactive bonding.

A 5 mil (0.127 millimeter) thick FEP Teflon film was used.

The adhesion of the sample to epoxy resin is made and tested using a modified ASTM Standard Number D 1002-72 (Reapproved 1983) lap shear test according to the following procedure. The modification to the ASTM standard consists of placing the FEP Teflon film in the 12.7 millimeter overlap region and applying an epoxy resin adhesive to both sides of the FEP Teflon film, otherwise the ASTM standard was followed according to its instructions. Prepared metal strips of 304 stainless steel are positioned as described in the ASTM test procedure.

The metal strips measure about 4 inches (10.2 centimeters) by about 1 inch (2.54 centimeters) by about 0.0625 inches (1.6 millimeters) and are prepared by the following procedure. First, the metallic strips (second substrate) are degreased for about thirty minutes in an ultrasonic bath containing Chlorothene ™ solvent. Chlorothene ™ is a trademark of The Dow Chemical Company. The metal strips (second substrate) are then rinsed with water and placed in an approximately 4 weight percent aqueous solution of sodium hypophosphite for about thirty minutes. They are then rinsed with water and air dried.

The following epoxy resin formulation is used as the first substrate:

D. E. R. ™ 331 epoxy resin (a trademark of The Dow Chemical Company, Midland Mich.);

$CaCO_3$ filler added at about 30 parts $CaCO_3$, per hundred parts resin by weight; and Versamid 140 ™ polyamide, as an amine hardener, (a trademark of Henkel Corporation, Minneapolis, Minn) at about 47 parts Versamid 140 ™ polyamide per hundred parts resin by weight.

Spacer wires with a thickness of about 3 mils (0.076 millimeters) are used to maintain the thickness of the prepared sample.

The sample is cured at room temperature for about two days, with a postcure at about 100° C. for about one hour. Pressure is applied to the 12.7 millimeter overlap region during cure and postcure through the use of ACCO medium binder clips. After postcure, any excess epoxy resin (first substrate) that extends out from the 12.7 millimeter overlap region is removed by filing with a Dremmel tool. An Instron analytical instrument, with a 20,000 pound load cell adjustable from 500 to 20,000 pounds full scale, is used to test the strength of the bond. The crosshead speed is about 0.05 inches per minute.

See the following table for values obtained.

| Test Specimen | Lap Shear, pounds per square inch | Failure Code* |
|---|---|---|
| 1040 EW polymer derivatized with: triethylenetetramine | 1230 1440 | a a |
| 1040 EW polymer derivatized with 4,9-dioxa-1,12-dodecanediamine | 1390 1420 | a a |
| 1040 EW polymer derivatized with n-butyl amine | 920 | a |
| 8000 EW polymer derivatized with triethylenetetramine | 1280 1050 1250 | b a b |
| Teflon ™ FEP, control sample | 98 145 98 188 | a a a a |

*Failure Code
a- Failure is adhesive and occurs primarily between the fluoropolymer and the epoxy resin adhesive (first substrate).
b - Failure is adhesive and occurs in two ways. In some regions failure occurs between the epoxy resin adhesive (first substrate) and the fluoropolymer as in "a" above. In other cases the failure occurs between the epoxy resin (first substrate) and the metal (second substrate).

EXAMPLE 2

This example compares the adhesion of commercially cementable FEP Teflon ™ to the adhesion of derivatized fluoropolymer bonded to epoxy resin (first substrate). This example illustrates the embodiment of the invention represented in FIG. 3.

An 1142 equivalent weight sulfonyl fluoride functional fluoropolymer film having a thickness of about 4 mil (0.10 millimeters) is derivatized with diaminocyclohexane at room temperature (about 25° C.) in a tightly capped bottle for about two hours. The resulting fluoropolymer film is cut into strips about 1 inch (2.54 centimeters) by about 0.5 inch (1.27 centimeters) for the modified ASTM lap shear test designation D 1002-72 (Reapproved 1983). As in Example one, the test is modified by placing fluoropolymer film in the 12.7 millimeter overlap region. For this adhesion test carbon steel strips (second substrate), about 4 inches (10.2 centimeters) by about 1 inch (2.54 centimeters) by about 0.0625 inches (1.6 millimeters), are prepared by buffing on a sander to expose a fresh metal surface, followed by degreasing in an ultrasonic bath containing Chlorothene ™ solvent for about an hour.

The adhesive formulation used as the first substrate is as follows:

D. E. R. 331 TM epoxy resin; CaCO₃ at about 30 parts CaCO₃ per hundred parts resin by weight as a filler;

Ancamine 1922 TM diethylene glycol diaminopropyl ether (available from Pacific Anchor Chemical, 6055 Ease Washington Blvd., Suite 700, Los Angeles, Calif. 90040) at a level of about 29 parts Ancamine 1922 diethylene glycol diaminopropyl ether per hundred parts resin, as a hardener.

The adhesive formulation (first substrate) is applied to the 12.7 millimeter overlap region of the metal strips (second substrate) and about 3 mil thick (0.076 millimeters) spacer wires are positioned to maintain adhesive thickness. Next, the fluoropolymer film is placed on top of the adhesive (first substrate) and the metal strips (second substrate) are clamped with ACCO medium binder clips. Cure is overnight at room temperature followed by a postcure at about 100° C. for about two hours.

As a control, commercially available FEP Teflon TM Type C-20 having a thickness of about 3 mil (0.076 millimeters) is assembled for lap shear tests in the same manner as described above. The FEP Teflon TM Type C-20 is sold as a bondable two-sided film. After postcure, excess adhesive is removed using a Dremmel tool. An Instron analytical instrument with a 20,000 pound load cell adjustable from 500 to 20,000 full scale is used to determine lap shear strength. The crosshead speed is about 0.05 inches per minute (1.3 millimeters per minute). See the following table for values.

As a further performance test, additional lap shear specimens are set up for weathering trials. weathering consists of immersion in boiling water for about 1 hour followed by immediate testing of lap shear strength. Values are tabulated in the following table.

| Sample | Lap Shear Strength | |
|---|---|---|
| | No Weathering | After Weathering |
| FEP Type C-20 | 1860 | 1640 |
| | 2000 | 1360 |
| | 2140 | 1520 |
| | 1860 | 1360 |
| | 2060 | 1680 |
| Average | 1984 | 1512 |
| Std. Deviation | 124 | 151 |
| Derivatized | 3440 | 2120 |
| Fluoropolymer | 3000 | 3020 |
| | 3260 | 2880 |
| | 2480 | 3040 |
| | 3440 | 2380 |
| Average | 3124 | 2688 |
| Std. Deviation | 403 | 415 |

Calculation of strength retained after weathering:
$$\frac{\text{Lap shear strength weathered}}{\text{Initial lap shear strength}} \times 100$$

The FEP Teflon TM retained about 76% of its strength. The derivatized fluoropolymer retained about 86% of its strength.

The failure is adhesive between the fluoropolymer film and the epoxy resin adhesive (first substrate) for the FEP films. The failure is cohesive in the fluoropolymer film for the derivatized fluoropolymer.

EXAMPLE 3

This example shows the attachment of PTFE (first body) to carbon steel (second substrate) using a derivatizable fluoropolymer to provide adhesion to an epoxy resin (first substrate).

An approximately 1031 equivalent weight sulfonyl fluoride functional fluoropolymer is bonded to PTFE (first body) through hot melt bonding to PFA Teflon TM as described below.

U.S. Pat. No. 3,946,136 teaches the procedure for bonding PFA Teflon TM to PTFE. A PFA Teflon TM film having a thickness of about 3 mil (0.076 millimeters), is placed over a clean piece of PTFE having dimensions of about 3.5 inches (8.9 centimeters) by about 10 inches (25.4 centimeters) by about 0.125 inches (0.3 centimeters). The PFA Teflon TM film is slightly larger than those dimensions, giving about a 0.5 inch (1.3 centimeters) overhang on the sides. Nonstick plates capable of withstanding 750° F. (400° C.) are placed on top and on bottom of the assembly. This assembly is then placed in an approximately 720° F. (382° C.) hydraulic press for about 1 minute without pressure A pressure of 286 pounds per square inch (1971 kilopascals) is then applied for an additional minute. The sample is removed and allowed to cool. At this point the PFA Teflon TM is found to have been attached to the PTFE through hot-melting, but not through reactive bonding.

Next a layer of derivatizable fluoropolymer 100 mixed with PFA Teflon TM is placed on top of the PFA Teflon TM (first body) and melted. The mixture consists of equal weights of the two fluoropolymer powders which have been tumbled in a ball mill for about 45 minutes to provide mixing. The mixture is applied to a depth of about 0.25 inches (0.6 centimeters). To melt, the assembly is placed in a 700° F. (371° C.) hot press for about 2 minutes without pressure followed by about 2 minutes at about 286 pounds per square inch pressure (1971 kilopascals).

As the final step in the assembly, a film of derivatizable fluoropolymer (first substrate) in sulfonyl fluoride form 5 to 10 mil (0.127 to 0.254 millimeters) thick is applied as the outer layer on top of the mixed powder layer (fluoropolymer 100) by the following procedure. The assembly is placed in a hot press at about 595° F. (312° C.) for about 3 minutes without pressure, followed by about 3 minutes at about 286 pounds per square inch pressure (1971 kilopascals). Melt bonding occurs between the melted mixed powder layer and the derivatizable fluoropolymer. If bubbles appear at any hot step in the above procedure, that particular heat cycle is repeated. The total thickness of the assembly is about 157 mil (about 4 millimeters).

The above assembly is immersed in diaminocyclohexane for about two hours in a sealed vessel at room temperature. Excess amine is then removed by washing with methanol. To test adhesion, the ASTM D 1781-76 (Reapproved 1981) "Climbing Drum Peel Test for Adhesives" procedure is used. For each trial a piece of carbon steel (second substrate) having dimensions of about 0.125 (3.2 millimeters) by about 3.5 inches (8.9 centimeters) by about 8.5 inches (21.6 centimeters) is buffed on a sander to provide a fresh metal surface. This buffing is followed by degreasing in an ultrasonic bath with Chlorothene TM solvent for about one hour. Next, the derivatized side of the fluoropolymer assembly is attached to the prepared metal using the following adhesive formulation:

D. E. R. 331 TM epoxy resin, CaCO₃ 30 parts per hundred parts resin, and Ancamine 1922 TM diethylene glycol diaminoporpyl ether at a level of about 29 parts per hundred parts resin.

Spacer wires about 3 mil (0.076 millimeters) thick are used to maintain adhesive thickness. ACCO medium binder clamps are used to hold the test piece during cure and postcure. Cure is overnight at room temperature followed by a two hour postcure at about 100° C.

Testing is performed on a Tinius-Olsen instrument in accordance with the ASTM procedure listed above [D 1781-76 (Reapproved 19810]. Crosshead speed is about 1 inch per minute (2.54 centimeters per minute). As a further test of adhesion, weathering studies are done by immersing cured test pieces in boiling water for one hour These samples are then tested. See below for results.

| Climbing Drum Peel Test Average Peel Torque (inch-pounds per inch) | |
|---|---|
| No Weathering | After Weathering |
| 97.1 | 67.9 |
| 96 | 72.1 |
| 94.8 | — |
| Average: 95.4 | Average: 70 |

The failure is adhesive with failure occurring between the epoxy resin adhesive (first substrate) and the functional fluoropolymer in some regions, but between the metal (second substrate) and the epoxy resin (first substrate) in others.

Chandler, D. G. "The Design, Fabrication, and Use of Thermoplastic-Lined FRP Chemical Handling Equipment" presented at Corrosion/81, Apr. 6-10, 1981 sponsored by the National Association of Corrosion Engineers, paper #34 states that 50 inch-pounds per inch (222 millimeter-Newtons/millimeter) is a minimum acceptable value for thermoplastic lined-fiber reinforced plastic (FRP Teflon TM)

EXAMPLE 4

This example shows the use of a derivatized fluoropolymer to lower dielectric properties of a reactively bonded composite.

As a first step, derivatized fluoropolymer powder 100 is prepared by the following procedure. Ten grams of an approximately 1031 equivalent weight sulfonyl fluoride functional fluoropolymer 100 are placed in about 125 milliliters of 1,1,2-trichloro-1,2,2-trifluoroethane suspending agent to which about 22.2 grams of diaminocyclohexane are added. The suspension is stirred for about two hours at room temperature in a sealed vessel. The functional fluoropolymer 100 is then collected on a basket type centrifuge. The functional fluoropolymer 100 is washed in the centrifuge with about 3 liters of water followed by about 1.5 liters of methanol to remove excess amine. The functional fluoropolymer 100 is then dried in a vacuum oven at about 85° C. overnight.

The next step involves the preparation of an epoxy resin (first substrate 200) casting using the derivatized fluoropolymer according to the following procedure. To D. E. R. 383 TM epoxy resin, an amount of derivatized fluoropolymer 100 is added to equal about 60 parts derivatized fluoropolymer 100 per hundred parts epoxy resin, by weight. After about 1.5 hours, this mixture is heated to about 50° C. to reduce viscosity. Next the warm mixture is placed under vacuum to degas for about ten minutes. An amine hardener, diaminocyclohexane, is then added at about 16 parts amine hardener per hundred parts epoxy resin. The uncured resin/-fluoropolymer composite is poured carefully into a mold to minimize bubbles in the final casting. Cure is overnight at room temperature, followed by a postcure at about 100° C. for about two hours. After postcure, samples are cut from the casting for dielectric measurements.

As a control, a casting is prepared in the same manner for epoxy resin with no derivatized fluoropolymer added. Results are shown below.

1. D. E. R. 383 TM epoxy resin plus derivatized fluoropolymer had a sample thickness of about 138.6 mil (3.520 millimeters).

| Frequency KHz | Dielectric Constant |
|---|---|
| 1.0 | 3.819 |
| 5.0 | 3.750 |
| 10.0 | 3.717 |
| 50.0 | 3.632 |
| 100.0 | 3.593 |

2. D. E. R. 383 TM epoxy resin control. The sample had a thickness of about 136.6 mil (3.470 millimeters).

| Frequency KHz | Dielectric Constant |
|---|---|
| 1.0 | 4.109 |
| 5.0 | 4.065 |
| 10.0 | 4.037 |
| 50.0 | 3.951 |
| 100.0 | 3.909 |

EXAMPLE 5

This example shows the attachment of an amine salt form of fluoropolymer 100 to an epoxy resin (first substrate).

A 794 equivalent weight sulfonyl fluoride functional polymer (fluoropolymer) is converted first to its acid form and then to its amine salt form to demonstrate adhesion of the salt form to an epoxy resin (first substrate). To convert the polymer to its acid form, it is placed in an approximately 25 weight % aqueous sodium hydroxide solution and heated to about 80° C. for about of 16 hours. The film is allowed to cool and is then rinsed with water. It is then immersed in approximately 6 normal hydrochloric acid and heated to about 25° C. for about 2 hours. The film is then rinsed with water. The polymer is now in its sulfonic acid form. To convert it to a sulfonic acid amine salt form, the polymer is placed in an approximately 1 molar aqueous solution of ammonium chloride for about 1.5 hours.

Adhesive testing is performed using the modified ASTM Test designation D 1002-72 (Reapproved 1983) as described in Example 2. Metal strips are carbon steel prepared as described in Example 2. Film thicknesses average 2 to 4 mil (0.05 to 0.1 mm). The adhesive formulation, test preparation, and testing are as described in Example 2 with the exception of the cure and postcure times. These samples are cured for one hour at room temperature followed by a postcure of two hours at 100° C. See the following table for lap shear values.

| Lap Shear Strength Amine Salt | |
|---|---|
| Pounds per square inch | kilograms per square centimeter |
| 1180 | 76 |
| 1840 | 129 |
| 1340 | 94 |

| Lap Shear Strength Amine Salt | |
|---|---|
| Pounds per square inch | kilograms per square centimeter |
| 2400 | 169 |
| Average: 1665 | Average: 117 |
| Standard Deviation: 582 | Standard Deviation: 41 |

EXAMPLE 6

This example shows the attachment of the sulfonamide form of fluoropolymer 100 to an epoxy resin (first substrate).

A 794 equivalent weight sulfonyl fluoride functional polymer (fluoropolymer) is converted to its sulfonamide form by contacting the sulfonyl fluoride form of the fluoropolymer with diaminocyclohexane for about 4 hours at room temperature.

Adhesive testing is performed using the modified ASTM Test designation D 1002-72 (Reapproved 1983) as described in Example 2. Metal strips are carbon steel prepared as described in Example 2. Film thicknesses average 2 to 4 mil (0.05 to 0.1 mm). The adhesive formulation, test preparation, and testing are as described in Example 2 with the exception of the cure and postcure times. These samples are cured for one hour at room temperature followed by a postcure of two hours at 100° C. See the following table for lap shear values.

| Lap Shear Strength Sulfonamide | |
|---|---|
| Pounds per square inch | kilograms per square centimeter |
| 3400 | 239 |
| 3320 | 233 |
| 2800 | 197 |
| 3760 | 264 |
| 3000 | 211 |
| Average: 3256 | Average: 299 |
| Standard Deviation: 372 | Standard Deviation: 26 |

EXAMPLE 7

This example demonstrates reactive bonding between a urethane adhesive formulation (first substrate) and a sulfonamide functional fluoropolymer.

The urethane adhesive (first substrate) is a two-part formulation available from the H. B. Fuller Company. The product number is UR-2102. The datasheet for this adhesive states that Part A is castor oil and Part B is diphenylmethane diisocyanate. The adhesive is mixed 100 parts by weight Part A to 75 parts by weight Part B. The adhesive is cured at 150° F. for five hours. For this example a modified lap shear test ASTM test D 1002-72 (Reapproved 1983) is used. In this case rather than metal strips, polycarbonate strips are used. The polycarbonate strips have the dimensions of about 8.8 by about 2.4 by about 0.25 centimeters.

A 794 equivalent weight sulfonyl fluoride functional fluoropolymer film, between about 0.05 and 0.1 millimeters thick, is prepared by treatment with diaminocyclohexane at room temperature for about four hours. This film is coated with the urethane adhesive (first substrate) and positioned in the 12.7 millimeter overlap region of the polycarbonate strips for the lap shear test. Spacer wires, approximately 3 mil (0.076 millimeters) thick, are used to maintain adhesive thickness. Samples are cured as described in Example 2. A DREMMEL tool is used to remove excess adhesive. Testing is done on the Instron with a 20,000 pound load cell adjustable from 500 to 20,000 pounds full scale. The crosshead speed is 0.05 inches per minute.

Values are tabulated in the following table.

| Lap Shear Strength | |
|---|---|
| Pounds per square inch | kilograms per square centimeter |
| 1180 | 82.9 |
| 1240 | 87.2 |
| 1040 | 73.1 |
| 1180 | 82.9 |
| 1280 | 90.0 |
| 1100 | 77.3 |
| Average: 1170 | Average: 82.2 |
| Standard Deviation: 88 | Standard Deviation: 6.2 |

We claim:

1. A composite comprising:
   a functional fluoropolymer having pendant groups which terminate with a second reacting group; and
   a first substrate having a first reacting group,
   wherein at least a portion of the first reacting group and at least a portion of the second reacting group have reacted with each other to form covalent or ionic bonds wherein the functional fluoropolymer is represented by the formula:

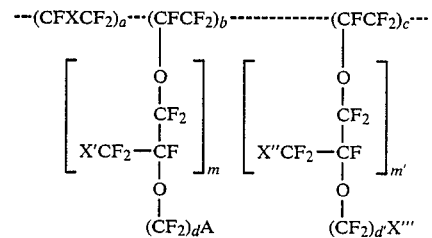

where:
   a and b are independently an integer greater than zero;
   c is zero or an integer greater than zero;
   X, X', X" and X'" are independently halogen, —CF$_3$ or a fluorinated alkyl having from 2 to 10 carbon atoms
   m and m' are independently an integer from zero to four;
   d and d' are independently an integer from one to six;
   A is a sulfonic group, a carboxylic group, or a derivative thereof.

2. The composition of claim 1 wherein c is 0, m and m, are 1, X is F, X', X", and X'" are independently F or Cl.

3. The composite of claim 1 wherein the functional fluoropolymer has an equivalent weight of from about 500 to about 10,000.

4. The composite of claim 1 wherein the functional fluoropolymer has an equivalent weight between about 600 and about 3000.

5. The composite of claim 1 wherein functional fluoropolymer is in it —SO$_2$F form.

6. The composite of claim 1 wherein the functional fluoropolymer is in its —$CO_2R$ form.

7. The composite of claim 1 wherein the functional fluoropolymer is in an amine form.

8. The composite of claim 1 wherein first reacting group forms covalent bonds with the second reacting group.

9. The composite of claim 1 wherein the first reacting group forms ionic bonds with the second reacting group.

10. The composite of claim 1 wherein the functional fluoropolymer is also bonded to a first body.

11. The composite of claim 1 wherein the functional fluoropolymer is a surface stratum of a first body.

12. The composite of claim 1 wherein the second substrate is selected from the group consisting of epoxy resins, functional hydrocarbon polymers, and urethanes.

13. The composite of claim 1 wherein the functional fluorocarbon is in the form of particles.

14. The composite of claim 1 wherein the first substrate is a melt formable, nonfunctional fluoropolymer.

15. The composite of claim 14 wherein the melt formable, nonfunctional fluoropolymer is FEP Teflon TM or PFA Teflon TM.

16. The composite of claim 1 wherein the first substrate is also bonded to a second substrate.

17. The composite of claim 16 wherein the second substrate is steel and the first substrate is an epoxy resin.

18. The composite of claim 16 wherein the second substrate is a nonfunctional material.

19. The composite of claim 18 wherein the nonfunctional material is selected from the group consisting of metals, ceramics, glass, and plastics.

20. The composite of claim 1 wherein the first substrate is in the form of particles.

21. The composite of claim 20 wherein the particles are epoxy resin particles.

22. The composite of claim 20 wherein the particles are a urethane.

* * * * *